United States Patent [19]

Scruggs

[11] Patent Number: 4,621,031
[45] Date of Patent: Nov. 4, 1986

[54] COMPOSITE MATERIAL BONDED BY AN AMORPHOUS METAL, AND PREPARATION THEREOF

[75] Inventor: David M. Scruggs, San Juan, Calif.

[73] Assignee: Dresser Industries, Inc., Dallas, Tex.

[21] Appl. No.: 672,120

[22] Filed: Nov. 16, 1984

[51] Int. Cl.$^4$ .................. B32B 15/04; C22C 27/04; B24D 3/06
[52] U.S. Cl. .................. 428/627; 428/621; 428/551; 148/403; 51/297; 51/307
[58] Field of Search .............. 428/551, 564, 565, 627, 428/634, 665, 684, 698, 679, 686, 699, 327, 328; 75/238, 243, 244, 242, 243, 244; 148/403; 29/10; 51/307, 297; 63/26

[56] References Cited

U.S. PATENT DOCUMENTS

| | | | |
|---|---|---|---|
| 3,294,186 | 12/1966 | Buell | 175/410 |
| 3,372,010 | 3/1968 | Parsons | 51/309 |
| 3,553,905 | 1/1971 | Lemelson | 51/106 |
| 3,574,579 | 4/1971 | Clarke | 51/307 |
| 3,599,316 | 8/1971 | Moskal | 29/473 |
| 3,743,489 | 7/1973 | Wentorf | 51/307 |
| 3,767,371 | 10/1973 | Wentorf | 51/307 |
| 3,868,234 | 2/1975 | Fontanella | 51/309 |
| 3,944,398 | 3/1976 | Bell | 51/307 |
| 3,982,911 | 9/1976 | Lee | 51/307 |
| 4,118,222 | 10/1978 | Tanner | 75/134 |
| 4,138,252 | 2/1979 | Vereschagin | 75/244 |
| 4,148,973 | 4/1979 | Sexton | 428/680 |
| 4,152,816 | 5/1979 | Ewing | 29/156.8 |
| 4,209,570 | 6/1980 | DeCristofaro | 428/606 |
| 4,212,669 | 7/1980 | Veeck et al. | 75/226 |
| 4,217,141 | 8/1980 | Schrittwieser | 75/244 |
| 4,221,592 | 9/1980 | Kay | 75/122 |
| 4,224,380 | 9/1980 | Bovenkerk | 428/545 |
| 4,224,381 | 9/1980 | Patel | 428/652 |
| 4,250,229 | 2/1981 | Kear et al. | 428/606 |
| 4,253,870 | 3/1981 | DeCristofaro | 75/159 |
| 4,282,034 | 8/1981 | Smith | 75/232 |
| 4,283,225 | 8/1981 | Sexton | 75/170 |
| 4,290,808 | 9/1981 | Ray | 75/251 |
| 4,302,515 | 11/1981 | DeCristofaro | 428/680 |
| 4,329,175 | 5/1982 | Turner | 75/208 R |
| 4,330,027 | 5/1982 | Narasimhan | 164/461 |
| 4,334,928 | 6/1982 | Hara | 75/238 |
| 4,389,074 | 6/1983 | Greenfield | 299/79 |
| 4,409,296 | 10/1983 | Ward | 428/610 |
| 4,413,406 | 11/1983 | Bennett et al. | 29/609 |
| 4,423,120 | 12/1983 | Paulus et al. | 428/614 |

Primary Examiner—John F. Terapane
Assistant Examiner—Eric Jorgensen
Attorney, Agent, or Firm—Gregory O. Garmong; William R. Peoples

[57] ABSTRACT

A composite material bonded by an amorphous metal. In one embodiment, a bonded piece is bonded to a substrate by a layer of amorphous metal interposed between the piece and the substrate. In another embodiment, a bonded composite material is formed with pieces of a second phase distributed throughout the volume of an amorphous matrix. In both embodiments, the second component of the composite is preferably a very hard material of low ductility, so that the composite material is useful in tooling applications. The solid composite material is formed by solid state processing, wherein the pieces are placed in contact and then consolidated at a temperature which does not exceed the crystallization temperature of the amorphous metal.

6 Claims, 3 Drawing Figures

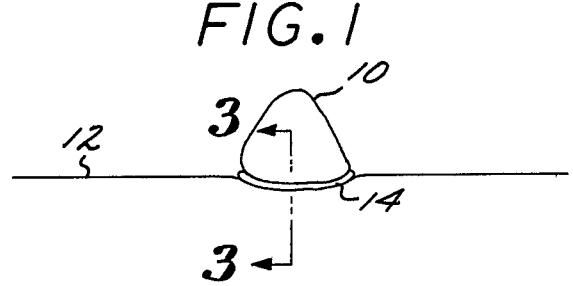
FIG. 1
FIG. 2
FIG. 3
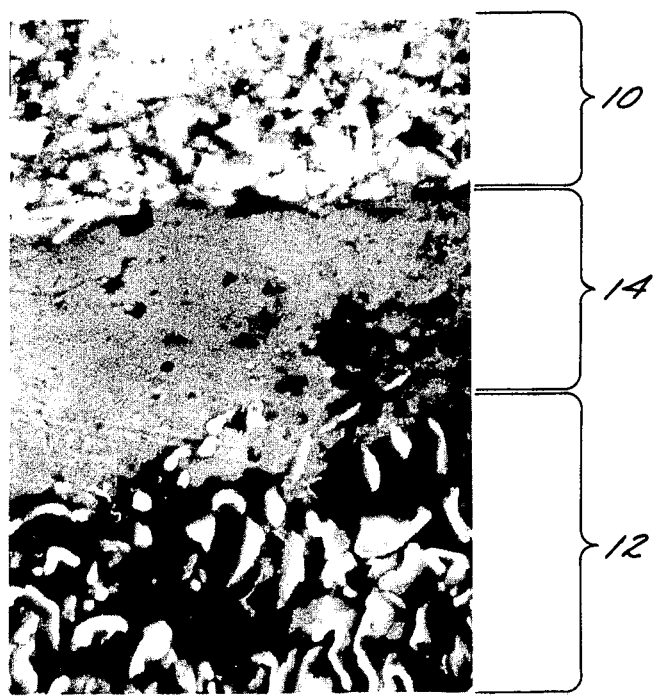
1 MICROMETER

COMPOSITE MATERIAL BONDED BY AN AMORPHOUS METAL, AND PREPARATION THEREOF

BACKGROUND OF THE INVENTION

This invention relates generally to amorphous metals, and, more particularly, to a composite material which utilizes an amorphous metal as the bonding medium.

Certain nonmetallic materials such as cubic boron nitride and boron carbide are very hard, with the necessary abrasion and wear resistance for use in implements used to work other materials. However, such very hard materials often lack ductility and fracture toughness, which are necessary in tools such as bits and cutters. Various approaches have been proposed for utilizing the abrasion and wear resistant of such nonmetallics, while at the same time either avoiding the drawbacks caused by their low ductility, or incorporating the nonmetallic into a material system which otherwise provides fracture toughness and some ductility.

For example, a piece of a nonmetallic may be attached to a substrate, so that the nonmetallic is positioned to perform a cutting or working operation. Diamond coated cutting wheels and sandpaper are examples of this approach. In another approach, small pieces of a very hard nonmetallic may be distributed throughout a ductile matrix, with the matrix acting to bond together the pieces of nonmetallic. The familiar tungsten carbide-cobalt sintered composite material is an example of such a material system. Although these approaches have found utility in many applications, full utilization of the properties of the nonmetallics is limited by the performance of the bonding material which bonds the nonmetallic to the substrate or to the other nonmetallics.

In both of these kinds of materials, where the nonmetallics are bonded to a substrate and where the nonmetallics are embedded in a matrix, the bonding medium is often the weak link in the material system. Where the nonmetallics are attached to a substrate, a weak bonding medium can lead to failure at the bond line, and thence to separation and loss of the hard nonmetallic cutting piece. For the composite material wherein the nonmetallics are distributed in a matrix, wear of the matrix can cause undercutting of individual nonmetallic particles at a wear surface, and thence to separation and loss of the nonmetallics. Moreover, cutting tools using nonmetallics must have satisfactory ductility and fracture toughness to absorb shocks produced during the cutting operation, and the bonding medium or matrix should assist in imparting ductility and fracture toughness to the composite.

In diamond-coated tools and other sandpaper-like structures, the bonding medium is typically an adhesive or other agent which is optimized for bond strength, and does not impart significant fracture toughness to the material. In distributed composite materials, such as the tungsten carbide-cobalt sintered composites, the cobalt matrix binds the hard nonmetallics and does impart some ductility and fracture toughness to the composite. The ductility and fracture toughness of the composite increase with increasing volume fraction of the metallic matrix, but at the same time the wear resistance decreases, so that an engineering compromise is usually made to select an acceptable volume fraction of the softer cobalt matrix. Yet even at its optimum matrix volume fraction, the toughness of tungsten carbide-cobalt is lower than desirable. Further, the bonding medium or matrix materials may be susceptible to severe corrosion or stress-corrosion damage in use.

For many of the nonmetallic materials having important commercial potential, there has been discovered no nonmetallic bonding agent which both has sufficient bond strength and also imparts fracture toughness to the composite. As an example, cubic boron nitride might find many important commercial applications in cutting implements if a satisfactory metallic bonding agent could be found.

Accordingly, there has been a need for an improved technique for utilizing hard nonmetallic materials in tooling applications. More specifically, there has been a need for an improved approach to a composite tool material wherein pieces of hard nonmetallics are joined to substrates or bonded within a composite matrix. Ideally, the bonding medium or matrix would be readily and strongly bonded to the nonmetallic, and in addition would be tough, ductile, strong, corrosion resistant, and have a sufficiently high thermal conductivity to dissipate heat produced during the cutting operation. Such composite materials should be readily fabricated in the solid state from available materials, to avoid the need for expensive processing technologies. Further, the composite should be operable in relation to a wide variety of materials, even those which may be chemically unstable in relation to each other at very high temperatures. The present invention fulfills this need, and further provides related advantages.

SUMMARY OF THE INVENTION

The present invention relates to a composite material and process for its preparation, wherein an amorphous material is utilized as a bonding agent. The amorphous bonding agent provides a good bond between second phase pieces and between second phase pieces and a substrate, even though the amorphous material is never melted or heated above its crystallization temperature during the fabrication procedure. Consequently, the matrix does not lose its amorphous character and the second phase pieces are not dissolved into the matrix or otherwise degraded, so that a wide variety of materials combinations may be utilized in the composite, even though a particular materials combination may be chemically unstable at very high temperatures. The amorphous material provides excellent bonding and is also of sufficient ductility and toughness to aid in achieving a superior composite material.

In accordance with the invention, a composite material includes an amorphous metallic matrix having pieces of a second material joined thereto. In one embodiment, a bonded composite material comprises a substrate, a bonded piece of a second material having relatively low ductility, and a layer of amorphous material interposed as a matrix beteen the bonded piece and the substrate, whereby the bonded piece and the substrate are bonded together. In another embodiment, a bonded composite material comprises an amorphous material matrix and a plurality of pieces of a second material, the pieces being distributed throughout the volume of the matrix, whereby the matrix bonds the pieces together.

The invention also encompasses the processes for preparing the composite material. In one embodiment, a process for preparing a bonded composite material having pieces of a second material bonded to a substrate, comprises the steps of providing the substrate and the pieces to be bonded in solid form; placing a layer of solid amorphous material between the piece of second material and the substrate to form an array; and consolidating the array to form a solid body, the step of consolidating to occur in a manner so that the temperature of the amorphous material does not exceed its crystallization temperature. In another embodiment, the process for preparing a bonded composite material comprises the steps of providing solid pieces of an amorphous material in finely divided form; providing solid pieces of a second material in finely divided forms; mixing together the pieces of amorphous material and second material to form a mixture; and consolidating the mixture to form a solid body, the step of consolidating to occur in a manner so that the temperature of the amorphous material does not exceed its crystallization temperature. Consolidation techniques include, for example, explosive compaction, or hot pressing at a temperature below the crystallization temperature of the amorphous material.

In a particularly preferred embodiment, the amorphous material has a hardness greater than about 1600 VHN, and the second material is a nonmetallic of an inherently hard and wear resistant composition such as diamond, cubic boron nitride, titanium diboride, or boron carbide. The amorphous matrix is strong, tough, relatively ductile, corrosion resistant, and itself has a high wear resistance that minimizes the undercutting of the bonding pieces by wear of the matrix. Although this presently preferred embodiment is specifically applicable to the use of hard nonmetallics in the field of cutting tools and other wear resistant materials, the principles of the invention are more broadly applicable to the preparation of other composite materials having an amorphous matrix, except as specifically noted.

It will be appreciated from the foregoing that the present invention represents a significant advance in the utilization of amorphous materials and also in the utilization of materials having very high hardnesses and wear resistance in the manufacture of tools. With the present invention, composite materials incorporating the favorable features of very hard, wear resistant, nonmetallic materials may be prepared, while at the same time minimizing the disadvantageous aspects. Specifically, a cutting tool may be prepared using nonmetallics of very high hardness and wear resistance as the principal wearing element, dispersed throughout or bonded by, a matrix which provides high strength, adequate ductility, fracture toughness, good bonding, thermal conductivity, corrosion resistance, and in addition is itself wear resistant so as to resist undercutting and undermining of the nonmetallics. Other features and advantages of the present invention will become apparent from the following more detailed description, which illustrates, by way of example, the principles of the invention.

BRIEF DESCRIPTION OF THE DRAWINGS

FIG. 1 is a sectional view of a piece of material bonded to a substrate by an amorphous layer;

FIG. 2 is a sectional view of a plurality of pieces distributed throughout an amorphous matrix; and FIG. 3 is a photomicrograph of the bonded region of a sample in the view of FIG. 1, taken generally along line 3—3.

DETAILED DESCRIPTION OF THE PREFERRED EMBODIMENT

In accordance with one embodiment of the present invention and as illustrated in FIGS. 1 and 3, a composite material is prepared as a layer of amorphous material interposed as a matrix between a substrate and a bonded piece, so that the amorphous material acts as a matrix to bond the bonded piece to the substrate. This embodiment is particularly useful in bonding relatively large pieces at the surface of a substrate. An example of such a structure would be a tooth made of a hard, wear-resistant material, such as nonmetallic cubic boron nitride, bonded to a rock bit cone made of steel by an amorphous material.

Referring to FIG. 1, a bonded piece 10 is bonded to a substrate 12 by a layer of amorphous material 14 interposed as a matrix between the bonded piece 10 and the substrate 12, whereby the bonded piece 10 and the substrate 12 are bonded together. FIG. 3 illustrates the microstructure of such a bonded composite material adjacent the bond line. The bonded piece 10 is sintered cubic boron nitride, the substrate 12 is 250 M maraging steel, and the amorphous layer 14 is an electroplate which was electrodeposited onto the surface of the substrate 14 prior to the bonding operation. In this instance, the amorphous layer 14 is a tungsten-cobalt-boron alloy having a composition of about 55 weight percent tungsten, 43 weight percent cobalt, and 2 weight percent boron.

In preparing the structure illustrated in FIG. 3, the electroplated amorphous layer 14 about 5–10 micrometers thick was first electroplated onto the 250 M maraging steel substrate 12. A piece of sintered cubic boron nitride 10 was then placed on top of the electroplated amorphous layer 14. This array was then consolidated to form a solid body at a temperature below the crystallization temperature of the tungsten-cobalt-boron amorphous material. Specifically, the array was heated to a temperature of about 700° C. and then hot pressed with a pressing pressure of 10,000 pounds per square inch (psi) for a period of 30 minutes. As illustrated in FIG. 3, excellent bonds are formed between the bonded piece 10 and the amorphous layer 14, and between the substrate 12 and the amorphous layer 14. In some areas, a minor amount of crystallization of the amorphous layer is observed, even though the hot pressing was accomplished at a temperature below the crystallization temperature. This minor amount of crystallization is believed to result from nucleation against the adjacent bonded portions. Such minor amounts of crystallization do not prevent the proper functioning of the amorphous layer in bonding the adjacent pieces together, and such minor crystallization is within the scope of the invention.

In another embodiment of the invention, a bonded composite material comprises an amorphous material matrix and a plurality of pieces of a second material distributed throughout the volume of the matrix, wherein the matrix acts to bond together the distributed pieces. FIG. 2 illustrates such a bonded composite material having an amorphous matrix 16 and a plurality of distributed pieces 18 distributed throughout the volume of the amorphous matrix 16. The view of FIG. 2 is taken adjacent a surface 20 of the composite, illustrating the mode of bonding of the distributed pieces 18 to the amorphous matrix 16, and the exposure of the amorphous matrix 16 at the surface 20. The amorphous matrix 16 acts to position the distributed pieces 18 and hold them together. This composite is useful in implements requiring abrasion and wear resistance, and also requiring strength with sufficient fracture toughness to resist impact loadings. Examples of such implements are grinding wheels, drill bits, rock bits, and machine tools. That the distributed pieces 18 are distributed throughout the volume of the composite material, rather than being located just at the surface 20, is of particular importance in such applications, since use of the composite material causes wear, which continually exposes new wear resistant portions at the surface 20. The composite material thus retains its usefulness despite wear and damage such as a chipping away of an entire portion of the tool.

A preferred process for preparing a bonded composite material in accordance with this second embodiment comprises the steps of providing solid pieces of an amorphous material in finely divided form and solid pieces of a second material in finely divided form, mixing together the pieces of the amorphous material and the second material to form a mixture, and then consolidating the mixture to form a solid body, the step of consolidating to occur in the manner so that the temperature of the amorphous material does not exceed its crystallization temperature. Consolidation may occur by any suitable technique, such as hot pressing as described previously or explosive compaction of the mixture. In explosive compaction, the mixture is placed into a container, and the container is compacted by the detonation of externally positioned explosive charges which consolidate the mixture to form a solid body. The explosive compaction increases the temperature of the amorphous material, but may be controlled to ensure that the temperature of the amorphous material does not exceed its crystallization temperature so as to cause crystallization of the amorphous material. Such consolidation by explosive compaction is specifically contemplated and included within the scope of the terminology of the present invention.

In the embodiments disclosed, the amorphous phase serves both as a binding medium and also as a means of imparting fracture toughness to the composite. Many amorphous materials are inherently strong, while retaining a sufficient amount of ductility to be resistant to brittle fracture. Many amorphous materials are thus functionally suitable for use in the composite of the present invention, but particularly preferred are amorphous materials themselves having a hardness value of greater than about 1600 VHN. Amorphous materials having hardnesses greater than about 1600 VHN exhibit surprising great wear resistance. Such amorphous materials resist the undermining of the pieces exposed to a wear-inducing environment, thereby prolonging the life of the tool.

In the composite material of the present invention, the principal resistance to abrasion and wear in operations such as machining, cutting, and grinding is provided by the embedded pieces present at the wearing surface in contact with the work piece at any particular moment. However, if the matrix lacks wear resistance, the abrasive effects on the workpiece can undermine and undercut the embedded pieces by wearing away the surrounding matrix material. The use of a matrix material which is inherently wear resistant, such as an amorphous material having a hardness greater than about 1600 VHN and also forming a strong bond with the hard pieces, significantly improves the wear resistance and useful life of the implement formed of the composite material.

The use of amorphous materials having hardnesses less than about 1600 VHN still provides important advantages to the composite material of the invention. Such amorphous materials are found to have excellent bonding properties with typical substrates, bonded pieces and distributed pieces. While applicant does not wish to be bound by this possible explanation, it is believed that the excellent bonding properties of the amorphous material result from the absence of a crystalline structure in the amorphous material, which improves the bonding properties by decreasing or removing the noncoincidence of atoms at the bond interface. Excellent bonds are thereby obtained without the need for partial dissolution of the substrate, the bonded piece, or the distributed pieces, or interdiffusion between the substrate, the amorphous phase, the distributed pieces or the bonded pieces.

The present invention finds particular utility in the preparation of hard, highly wear resistant composite materials. The preferred bonded pieces 10 and distributed pieces 18 are therefore nonmetallic materials which themselves have very high hardness numbers. Such materials include diamond having a hardness of about 10,000 VHN, cubic boron nitride having a hardness of about 5,000–7,500 VHN, boron carbide having a hardness of about 4,000–5,000 VHN, titanium diboride having a hardness of about 3,400 VHN and tungsten carbide having a hardness of about 2,400 VHN. Such nonmetallic materials have the indicated high hardnesses, but are not suitable for use in tooling in their bulk form because they have very low ductility and fracture toughness, and can shatter into small pieces under impact loadings. The ductility of such materials is very low, and substantially zero, where ductility is understood to mean the extent of plastic deformation prior to failure. As used herein, a material of low ductility is a material no amenable to plastic deformation in conventional metalworking processes such as rolling, and typically a low ductility material plastically elongates less than about 5 percent before failure.

The relative percentages of the amorphous material, pieces of the second material, and substrate, commonly expressed as a fraction or percentage of the total volume or as a thickness of the amorphous material, is not critical and may range from very small amounts of the amorphous material to a structure which is nearly entirely amorphous material. It is preferred that the composite material be fully dense and without porosity or voids, but small amounts of such porosity are acceptable and consistent with the fabrication procedures utilized in the invention. It is preferred that the amorphous material be substantially completely amorphous, but some crystalline material is tolerated.

Selection of the relative fraction of the different constituents of the composite is accomplished in part by consideration of the specific application. If relatively higher hardness and lower toughness is required of the composite material, then the fraction of the hard second phase is increased. Conversely, if higher toughness and lower wear resistance is required, the amount of the amorphous material is increased. The technique for selection of optimum combinations of properties will be apparent to those skilled in the art, as graphs of properties such as wear resistance, toughness, strength, ductility, or other desirable properties may be prepared by measuring the properties for a range of fractions or thicknesses of the constituents. Examination of such graphs yields a determination of the optimum properties for a particular engineering application.

The form and shape of the hard second phase pieces may be varied as desired. Where the pieces are relatively large in size, they should be physically compatable so as to have a matching surface adjacent the substrate. When the second phase is utilized as distributed pieces within an amorphous matrix, the distributed pieces are preferably approximately equiaxed to avoid the introduction of long crack propagation paths within the composite. Alternatively, for example, where the benefits of fiber composite strengthening are desired, the pieces may be provided as elongated rods or wires and oriented with their long axes parallel. Other possible configurations of the distributed pieces will be apparent to those skilled in the art.

In the embodiment of the invention wherein the amorphous material is provided as a layer between a substrate and a bonded piece, the amorphous layer may be fabricated by any of several techniques known in the art. For example, the amorphous layer may be fabricated as a strip of metal rapidly quenched from the liquid state against a revolving metallic drum. In another approach, the amorphous layer may be deposited onto the surface of the bonded piece or the substrate prior to bonding, using electrodeposition, sputtering, or other techniques. In yet another approach, a portion of the surface of the substrate may be transformed to the amorphous state by a high intensity heat pulse such as provided by a laser, if the substrate itself is of a composition susceptible to the formation of an amorphous material upon rapid quenching.

In the embodiment of the invention wherein the second phase pieces are distributed throughout an amorphous matrix, the composite matrix may be fabricated from previously prepared amorphous metal powders. Methods for preparing amorphous powders are well known, and include, for example, the spraying of a stream of liquid metal to cause rapid solidification as an amorphous metal powder. When examined by X-ray diffraction, such amorphous metal powders show essentially no crystallinity or other long range atomic arrangements.

In this embodiment, the pieces to be distributed in the amorphous metal matrix are preferably provided as chunks, powders, granules, or other readily fabricated pieces. The amorphous metal powder particles are mechanically intermixed with the pieces of the second material, either manually or with a mechanized mixer such as a ball mill. The mixing distributes the amorphous metal powders and the pieces of the second material together to achieve essentially complete mixing.

The mixture is then consolidated into a solid composite material comprising a solid body of the amorphous metal having a plurality of pieces of the second material distributed therethrough by any of several solid state techniques. In the presently preferred technique of explosive bonding, the powder is placed into a metal container, and explosive charges are positioned adjacent the container and ignited. The detination collapses the walls of the container, and the amorphous powder and pieces of the second material contained therein are compacted under the explosive compression. Such explosive, rapid compression is found to compact and bond together the materials in the container without inducing crystallization of the amorphous material. The container may be machined or cut away from the compacted mass, and the resulting composite material shaped into a useful implement. Alternatively, the container may be left in place and worn away in use to expose the compacted mass.

In an alternative to explosive bonding, a mixture prepared in the manner described previously is hot pressed under an applied external force at a temperature below the crystallization temperature of the amorphous metal. The hot pressing deforms one or both of the components of the mixture, so as to remove porosity and induce bonding of the amorphous powder particles together, and also bonding of the amorphous material to the distributed pieces. Since the crystallization temperature of the amorphous metal is always well below its melting point, there cannot be dissolution of the distributed pieces in the amorphous metal or substantial interdiffusion of the distributed pieces and the amorphous metal. The fabrication techniques described herein therefore have the important advantage that the distributed pieces need not be chemically inert in the amorphous metal when the amorphous metal is in its liquid state. Nor is fabrication limited by different densities of the amorphous matrix material and the distributed pieces. A uniform distribution of the distributed pieces throughout the entire volume may thus be obtained.

Although the present preferred embodiment of the invention is directed toward the preparation of abrasion and wear resistant composite materials for use in implements usch as drill bits, rock bits, abrasive wheels and the like, the invention is not so limited and may be applied to the preparation of composite materials having an amorphous matrix or bonding layer for use in other applications. For example, amorphous materials reinforced with distributed fibers aligned in a particular direction may be prepared by constructing an array of the distributed phase and then compacting an amorphous material around the array. The second material could also be an amorphous material, so that a multiphase amorphous alloy is formed by the bonding technique. Other such applications will be readily apparent to those skilled in the art.

It will now be appreciated that, through the use of this invention, a composite material may be fabricated wherein an amorphous alloy is used to bond together pieces of a second phase. The use of hard, wear-resistant pieces of a second material and a tough, ductile, corrosion-resistant and wear-resistant amorphous material matrix or interlayer yields a composite having excellent wear resistance and suitable for making cutting, drilling, and metalworking emplements. Although particular embodiments of the invention have been described in detail for purposes of illustration, various modifications may be made without departing from the spirit and scope of the invention. Accordingly, the invention is not to be limited except as by the appended claims.

I claim:

1. A bonded composite material, comprising:
   a substrate;
   a piece of second material having a low ductility; and
   a continuous layer of amorphous metal interposed as a matrix between said piece of second material and said substrate, whereby said piece and said substrate are bonded together by the amorphous metal.

2. The composie material of claim 1, wherein said piece of second material has substantially zero ductility.

3. The composite material of claim 1, wherein the substrate is steel.

4. The composite material of claim 1, wherein the bonded piece is selected from the group consisting of diamond, titanium diboride, boron carbide, and cubic boron nitride.

5. The composite material of claim 1, wherein said amorphous metal contains some crystalline material.

6. The composite material of claim 1, wherein said amorphous metal has a hardness of greater than about 1600 VHN.

* * * * *